W. R. WALKER.
CLOTHES WASHING MACHINE.
APPLICATION FILED MAR. 28, 1921.
1,437,163.
Patented Nov. 28, 1922.
5 SHEETS—SHEET 3.
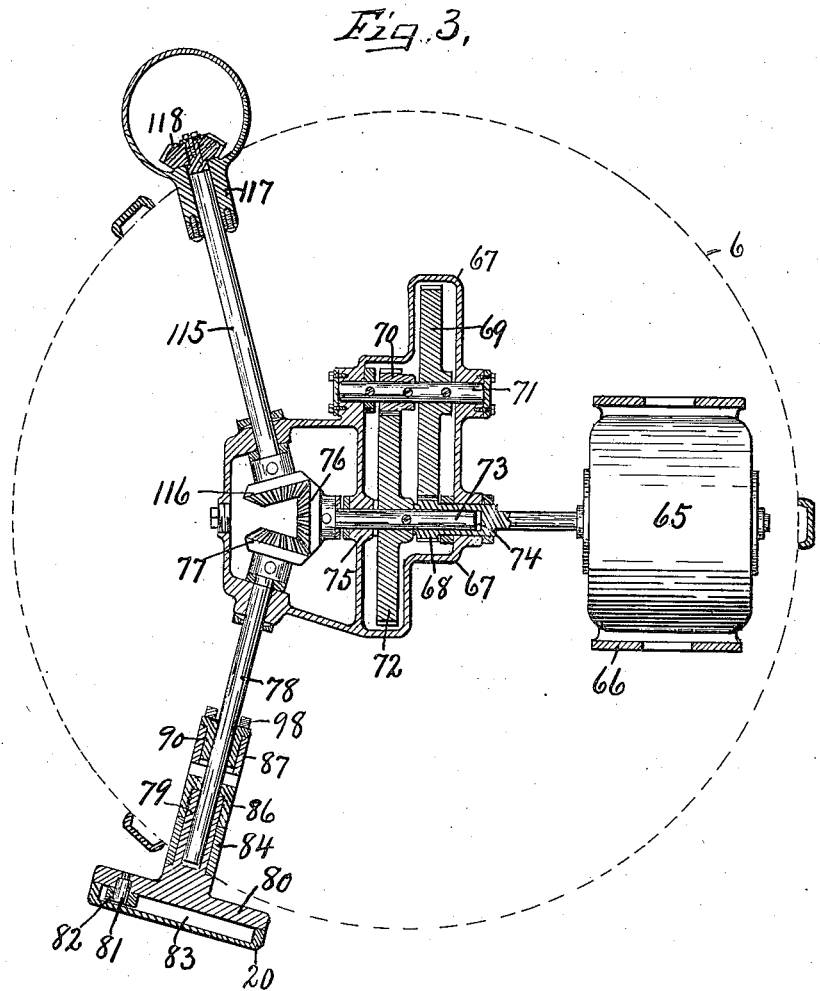

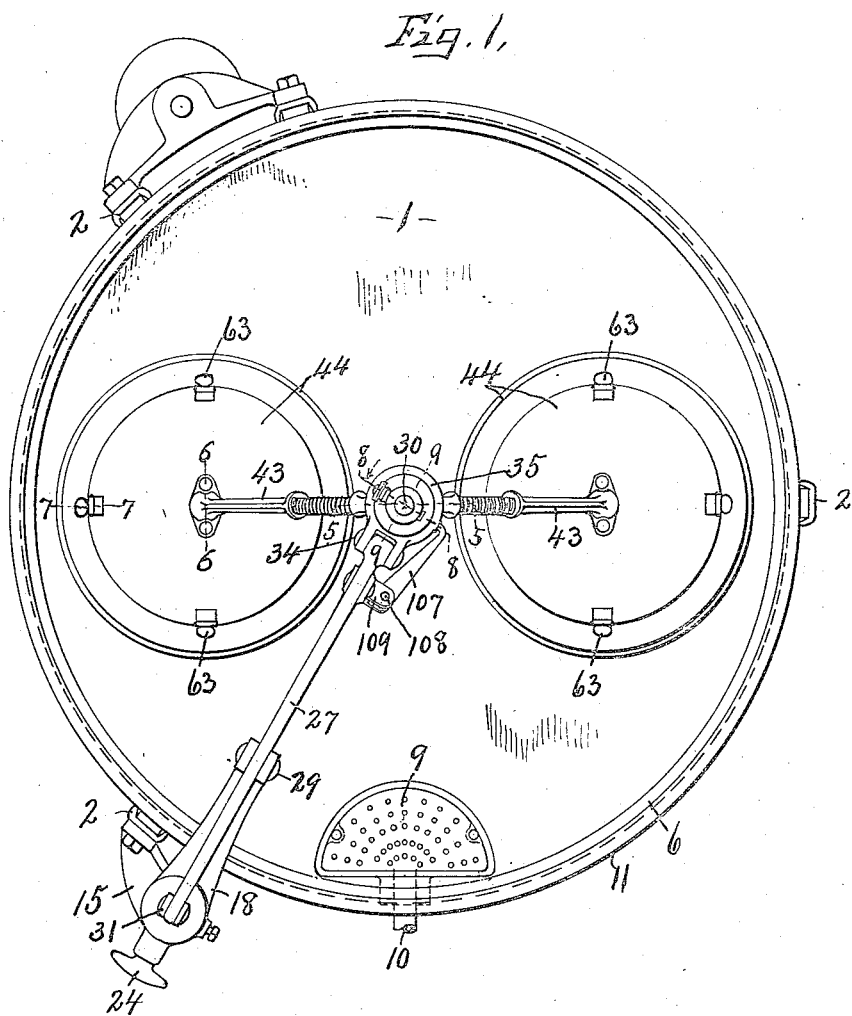

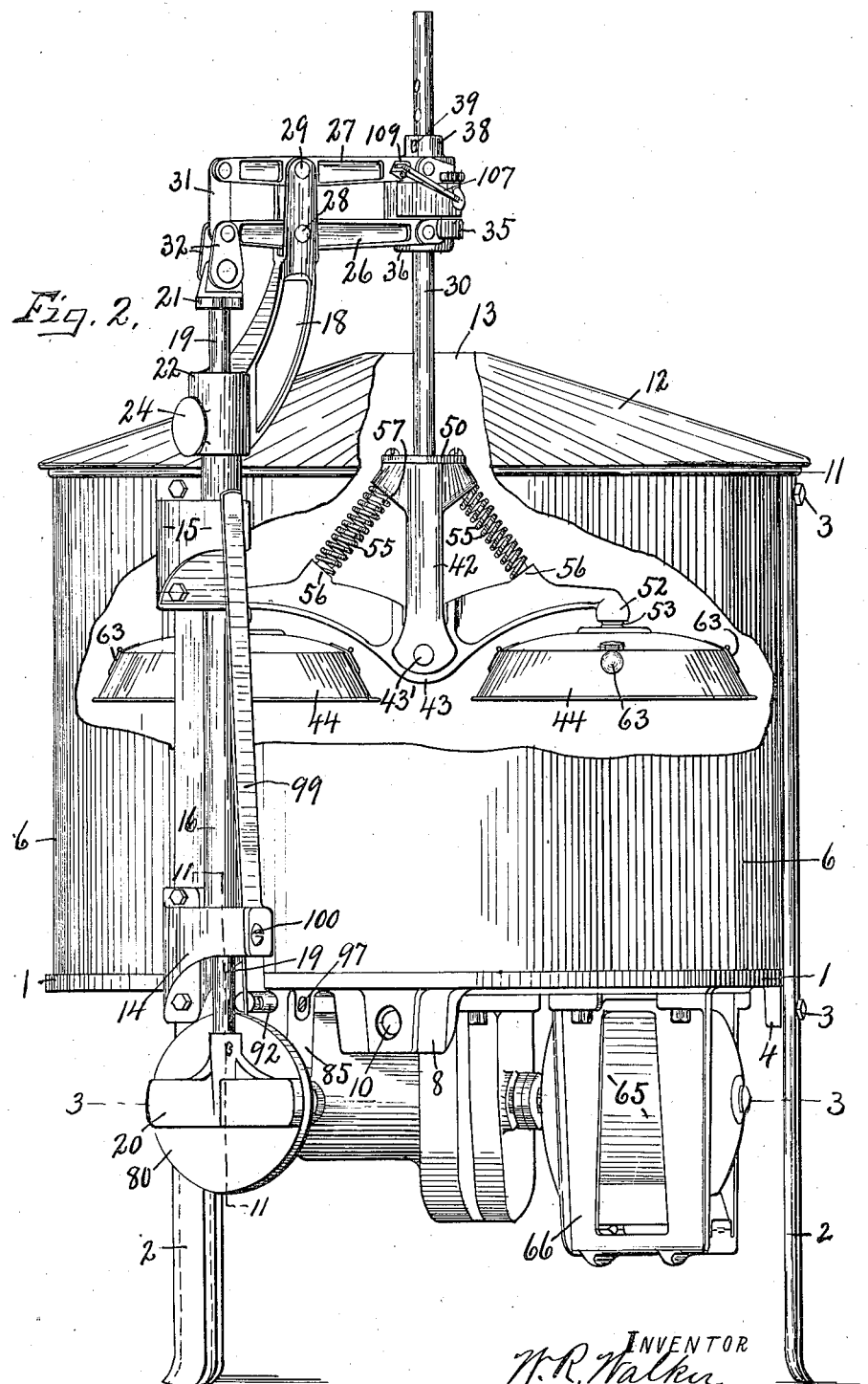

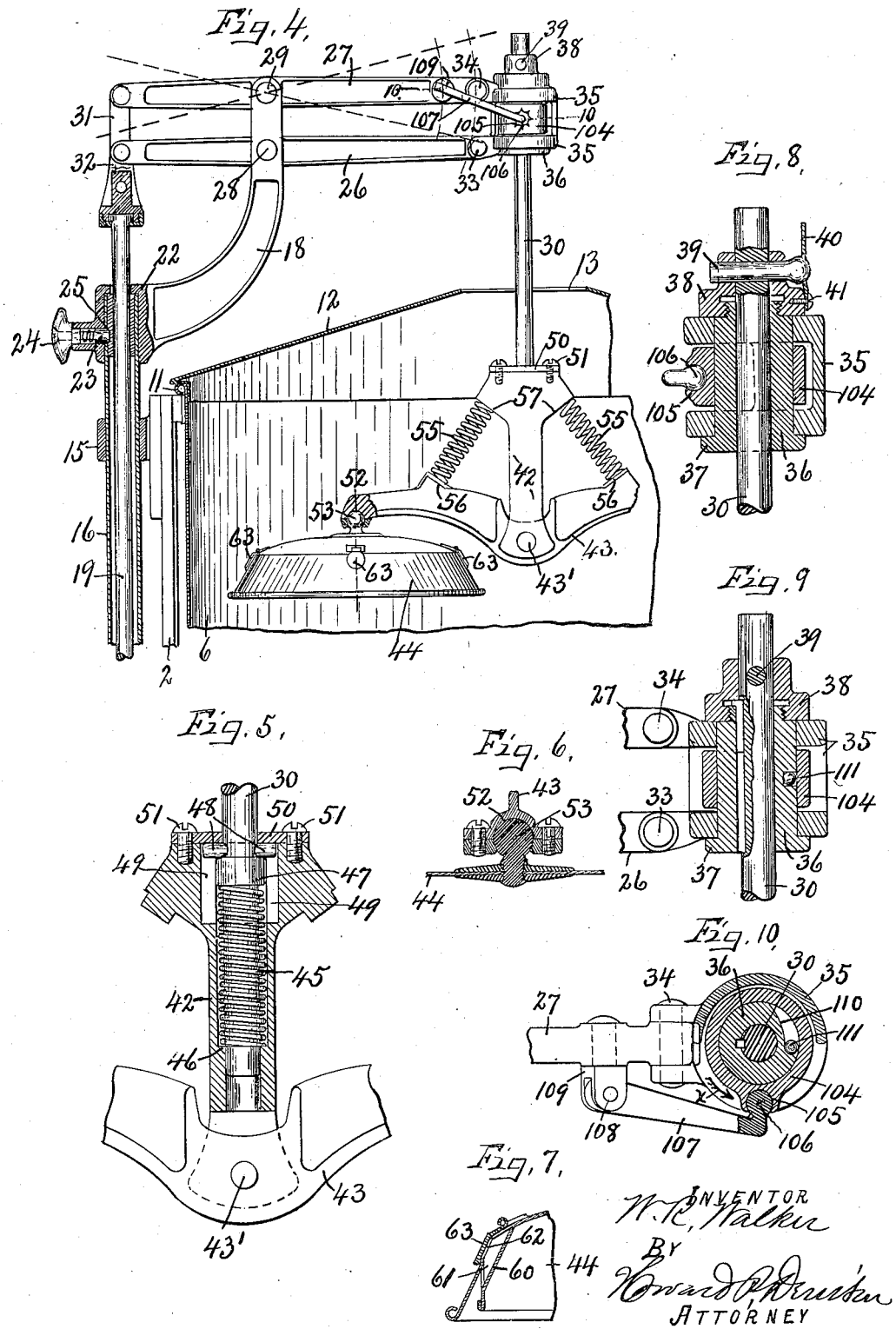

W. R. WALKER.
CLOTHES WASHING MACHINE.
APPLICATION FILED MAR. 28, 1921.
1,437,163.
Patented Nov. 28, 1922.
5 SHEETS—SHEET 5.
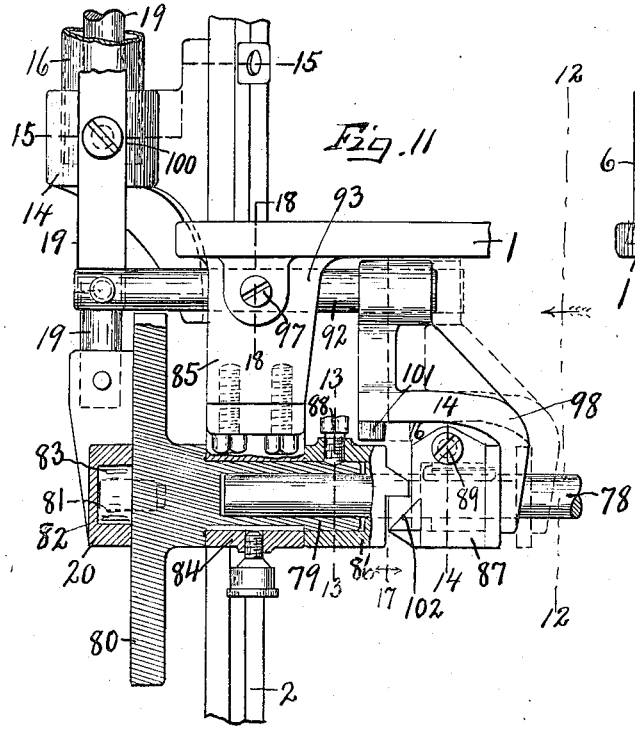
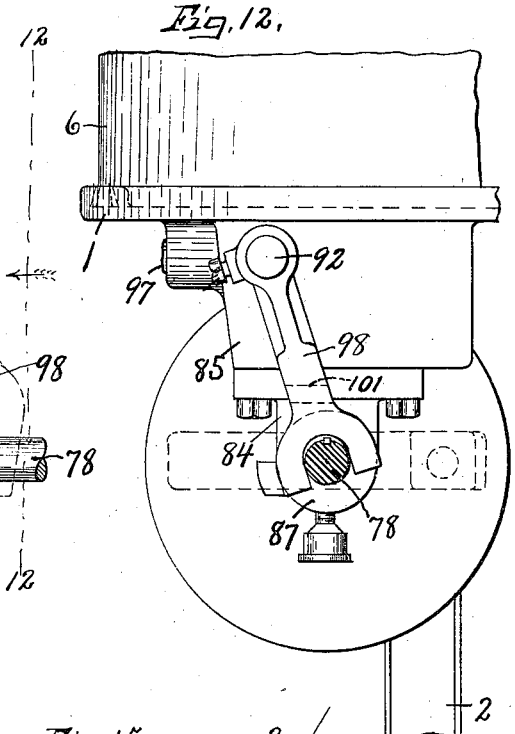
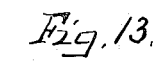
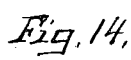
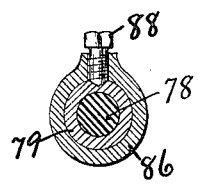
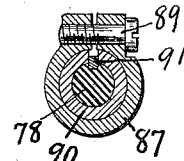
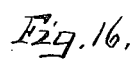
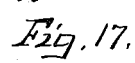
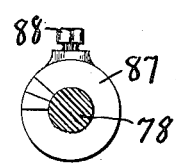
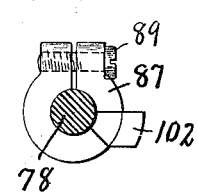
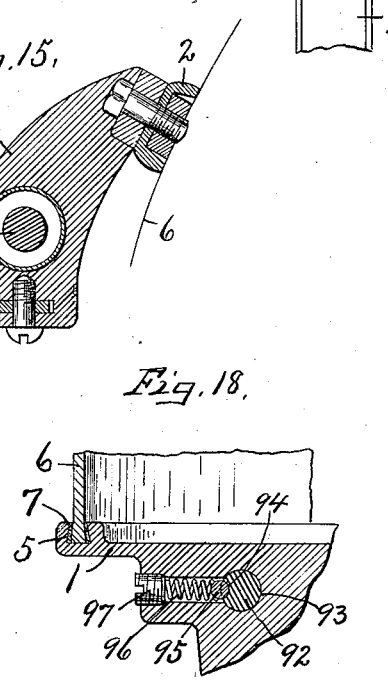
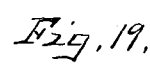
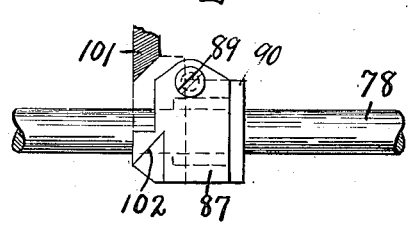

Patented Nov. 28, 1922.

1,437,163

UNITED STATES PATENT OFFICE.

WILLARD R. WALKER, OF SYRACUSE, NEW YORK, ASSIGNOR TO WALKER BROTHERS COMPANY, OF SYRACUSE, NEW YORK, A CORPORATION OF NEW YORK.

CLOTHES-WASHING MACHINE.

Application filed March 28, 1921. Serial No. 456,288.

*To all whom it may concern:*

Be it known that I, WILLARD R. WALKER, of Syracuse, in the county of Onondaga, in the State of New York, have invented new and useful Improvements in Clothes-Washing Machines, of which the following, taken in connection with the accompanying drawings, is a full, clear, and exact description.

This invention relates to a mechanical clothes washing machine of the power driven type set forth in my pending application 348,922 filed January 2, 1920 in so far as it involves the use of inverted cup shaped dashers movable vertical within the vat and driven by an underlying motor through the medium of external mechanism connected to a vertically reciprocatory plunger which is movable through the top of the vat and upon which the cup shaped dashers are carried as distinguished from that type of mechanical clothes washing machine in which the plunger is operated through the bottom of the vat, the main object being the unobstructed use of the entire capacity of the vat for washing purposes, and at the same time to avoid trouble of leakages incidental to the use of glands and similar joints in the vat below the water line.

The main upright body of the vat preferably consists of a thin sheet metal drum of circular form, and one of its specific objects is to provide a one-piece cast metal bottom with an annular groove for receiving the lower end of the drum together with a packing filling of lead solder or equivalent material to form a liquid tight joint, and at the same time to afford a rigid support for the drum for securement to the supporting legs without perforating the drum or bottom below the water line for that purpose.

Another object is to provide the cast metal bottom with a drainage outlet near one side and to incline the upper surface of said bottom from all points of the periphery thereof toward the outlet to secure perfect drainage.

Another object is to cause the external upright shaft to move rectilinearly in suitable bearings provided therefor, and at the same time to enable the reciprocal movement of said shaft to be adjusted to impart differential movement to the plunger carrying the cup shaped dashers.

A further object is to cause the plunger to move in parallelism with the external upright shaft, and at the same time to impart thereto a slight lateral motion, particularly while the cups are impinging against the clothes and also to support the cups in such manner that they may automatically adjust themselves to varying pressures at different parts in the periphery thereof.

Another object is to utilize a part of the parallel motion in conjunction with other mechanisms for imparting intermitting rotary motion to the plunger during its upward movement when free from engagement with the clothes.

A still further object is to provide a clutch in the connection between the motor shaft and external upright shaft for controlling the operation of the cup shaped dashers or plungers carrying the same, and also to provide means to assure the release of the clutch in case its shifting members should fail to operate the same.

Other objects and uses relating to specific parts of the machine will be brought out in the following description.

In the drawings:

Fig. 1 is a top plan of a mechanical clothes washer embodying the various features of my invention, the cover being removed.

Fig. 2 is a side elevation of the same machine, portions of the vat being broken away to show the interior mechanism.

Fig. 3 is a horizontal sectional view of the same machine taken on line 3—3, Fig. 2.

Fig. 4 is a vertical sectional view partly in elevation of the upper portion of one side of the machine showing more particularly the connection between the external upright shaft and the plunger carrying the cup shaped dashers.

Figs. 5, 6, 7, 8 and 9 are enlarged detail sectional views taken respectively on lines 5—5, 6—6, 7—7, 8—8 and 9—9, Fig. 1.

Fig. 10 is an enlarged horizontal detail sectional view of the upper portion of the plunger operating means taken approximately in the plane of line 10—10, Fig. 4.

Fig. 11 is an enlarged vertical sectional view through the lower portion of one side of the machine taken on line 11—11, Fig. 2.

Fig. 12 is an inner side elevation of the parts shown in Fig. 11 taken in the plane of 12—12, Fig. 11 except that a portion of the vat is shown in elevation.

Figs. 13, 14 and 15 are enlarged detail sectional views taken respectively on lines 13—13, 14—14 and 15—15, Fig. 11.

Figs. 16 and 17 are enlarged detail sectional views taken in the plane of lines 16—16 and 17—17, Fig. 11 looking in opposite directions.

Fig. 18 is an enlarged detail sectional view taken on line 18—18, Fig. 11 showing a lower portion of one side of the drum of the vat as seated in the groove in the cast metal base or ballot.

Fig. 19 is a side elevation of the clutch member and adjacent portion of the shaft shown in Fig. 11 with a part of the shifting member in section and in position to be engaged by a cam on the clutch for automatically releasing said clutch in case the shifting member has failed to effect that operation.

The main supporting frame of this machine comprises a substantially horizontal cast metal platform or bottom —1—, and a series of, in this instance three, upright legs —2— which are secured by bolts —3— to pendent lugs —4— on the underside of the platform —1— preferably integral therewith, said platform being preferably circular and provided with an annular groove —5— for receiving the lower end of the circular sheet metal drum —6—, and a suitable packing —7— of lead solder or other suitable material capable of producing a liquid tight joint.

The platform —1— and drum —6— constitute the vat for receiving the washing fluid and clothes to be washed, the platform —1— constituting the bottom of the vat and being provided near one side with a pendent hopper —8— having a perforated top —9— opening into the interior of the vat and also provided with an outlet —10— for draining the washing fluid from the interior of said vat, the upper face of the bottom wall —1— being inclined from all points in its periphery toward the drainage outlet —9— so as to assure complete drainage of the water therefrom.

The legs —2— extend upwardly along the outside of the vat in close proximity thereto and abut at their upper ends against the under side of an annular flange —11— forming the rim at the top of the vat to additionally support said vat upon the legs, which are additionally secured to the vat above the water line by bolts —3—.

A frusto-conical cover —12— is fitted upon the upper end of the vat, and is provided with a central elongated opening —13— to receive and permit the operation of a suitable plunger carrying the inverted cup shaped dashers, herein more fully described.

A pair of brackets —14— and —15— are rigidly mounted in vertically spaced relation on one of the legs —2— to receive and support an upright tubular post —16— which is stepped at its lower end in a socket in the lower bracket —14— and may be held against rotation or endwise movement therein by means of a tight fit or by any other suitable fastening means, said post being extended upwardly through an opening in the upper bracket —15— and some distance above the same for receiving and supporting at its upper end another bracket —18—.

An upright rod or shaft —19— extends entirely through and beyond the lower and upper ends of the tubular post —16— and is slidable vertically and axially in suitable bearings in the ends thereof, the lower end of said rod or shaft being secured to a crosshead —20— while its upper end is swiveled to another head —21—.

The bracket —18— is provided with a socketed head —22— telescoping with and seated upon the upper end of the post —16— and held against rotary movement by means of a locking-bolt —23— having a hand-piece —24— by which the bolt may be moved into and out of a socket or opening —25— in the adjacent portion of the tubular post —16— as shown in Fig. 4. The other end of the part —18— extends inwardly and upwardly some distance above the hub —22— for receiving and supporting a pair of levers —26— and —27—.

The levers —26— and —27— are fulcrumed intermediate their ends at —28— and —29—, respectively, and are arranged in vertically spaced relation and in parallelism for transmitting vertical motion from the shaft or rod —19— to a dasher-carrying-plunger —30—. For this purpose, the levers —26— and —27— extend outwardly and are substantially radial of the vat to lie directly over the upper end of the shaft or rod —19— to which they are connected by links —31— and —32—, Figs. 2 and 4, said links constituting an articulate connection between the outer ends of the levers and head —21— on the upper end of the rod —19— to allow the rectilinear motion of the rod —19— to be converted into rocking motion of the levers —26— and —27—.

The inner ends of the levers —26— and —27— extend radially and inwardly over the top of the vat and are pivotally attached at —33— and —34—, respectively, to one side of a vertically movable head —35—, which in turn is clamped to the periphery of the sleeve —36— on the upper end of the plunger —30—, as shown in Figs. 8 and 9.

The sleeve —36— is preferably —U— shaped and its opposite arms are provided with vertically registered openings for receiving the sleeve —36—, which is provided at its lower end with an annular flange —37— upon which the lower side of the head —35— rests, the upper end of said sleeve being reduced and threaded, and engaged by a threaded member —38— in contact with the upper face of the head —35—, and together with the flange —37— serving to hold the head against relative vertical movement of the sleeve.

The hub of the collar —38— and adjacent portion of the plunger —30— are provided with transversely registering apertures for receiving a locking-bolt or pin —39—, which is yieldingly held in operative position by spring-catch —40—, the latter being pivoted at —41— to be permitted to turn out of registration with the bolt —39—, thereby allowing the bolt to be removed and permitting the head —35— with the sleeve —36— therein to be withdrawn upwardly from operative connection with the plunger —30—, whereupon the locking-bolt —23— in the hub of the bracket —18— may be withdrawn against the action of its retracting spring, Fig. 4, to permit the bracket with the levers —26— and —27— thereon together with the head —35— on the levers to be rocked laterally or horizontal about the axis of the rod or shaft —19— to one side of the top of the vat, after which the plunger —30— with the dashers thereon may be readily withdrawn upwardly when the cover —12— is removed.

When the parts above described are assembled ready for use, the plunger —30— extends downwardly through the opening —13— into the vat, and carries at its lower end a tubular head or sleeve —42—, which in turn carries at its lower end a cross-arm or yoke —43— for supporting a pair of inverted cup shaped dashers —44— on the outer ends of its opposite arms.

The tubular sleeve —42— is slidable vertically of and upon the lower end of the plunger —30— against the action of a retracting spring —45—, Fig. 5, which surrounds the plunger —30— and is interposed between shoulders —46— and —47— on the sleeve —42— and plunger —30—, respectively.

The plunger —30— is provided with opposite radially projecting pins —48— which are adapted to slide in vertically elongated slots —49— in diametrically opposite sides of the central opening in the head —42— near the upper end thereof, said pins being normally engaged with the underside of a stop-plate —50— which is secured by screws —51— to the upper end of the sleeve or head —42—, Fig. 5.

The yoke —43— is pivoted or fulcrumed intermediate its ends at —43'— to the lower end of the head or sleeve —42— to rock vertically, and its outer ends are provided with spherical sockets —52— for receiving spherical bosses —53— on the apexes of the inverted cups —44—, thereby establishing universal joints or connections between the cups and yoke to permit the cups to rock vertically in all directions independently of the rocking movement of the yoke.

The yoke —43— is yieldingly held in a substantially horizontal position by diametrically opposite springs —55—, which are interposed between seats —56— on the yoke —43— and additional seats —57— on the upper end of the head or sleeve —42—, the distance between the lower ends of the springs being greater than that between the upper end, whereby said springs converge upwardly from the yoke to their seats of engagement with the top of the head or sleeve —42—, thus permitting opposite ends of the yoke to readily adjust themselves to varying thicknesses of clothes engaged by their respective dashers or cups —44—, all of which increases the efficiency of the machine and reduces the liability of breakage or impairment.

Each of the cups —44— is provided with an inner annular flange —60— extending downwardly from the upper wall thereof in spaced relation to the outer wall to form an intervening chamber —61— having a vent opening —62— in the upper outer wall thereof controlled by a valve —63— which opens outwardly to permit the escape of the trapped air in the chamber —61— as the cup enters the water against the clothes, thereby allowing the water to flow freely into said chamber and also into the remaining portion of the cup within the flange —60—, the latter being of less vertical height than the outer wall of the cup, or rather having its lower edge in a plane above that of the outer wall to allow the air to escape through the chamber —61— and open valve —63— upon the initial entrance of the lower edge of the outer wall of the cup into the washing fluid.

Each of the cups is usually provided with a series of these openings —62— and valves —63—, the purpose of which is to prevent the trapping of air in the cup on the down stroke into the water, and to enable the valve to close on the up stroke to produce a greater or less amount of suction upon the clothes during said up stroke for drawing the water through said clothes, it being understood that during the downward stroke, the water is also forced through the clothes, the effect of which is to produce a more thorough and efficient washing thereof.

The means for reciprocating the upright rod or shaft —19— is shown more clearly in Fig. 3 and comprises an electric motor —65— mounted in a suitable frame —66— on the under side of the platform —1—, and having its armature-shaft journaled in one side of a gear-case —67— and provided with a pinion —68—. This pinion meshes with a relatively larger gear —69— which together with a pinion —70— are secured to a supplemental shaft —71—, the latter being journaled in the gear-case or housing —67— parallel with the motor-shaft and has its pinion —70— meshing with a relatively larger gear —72—.

The gear —72— is secured to a rotatable spindle —73— having one end journaled in a socket —74— in the adjacent end coaxial with the motor shaft and its other end journaled in a partition —75— of the gear-case —67—, and provided with a beveled gear —76—, which meshes with a similar beveled gear —77— on the inner end of an outwardly extending counter-shaft —78—, both of said beveled gears being located within the gear-case —67—.

The counter-shaft —78— is journaled at its inner end in one side of the gear-case —67— and has its outer end loosely journaled in the socketed hub —79— on a rotary disk —80—, which in turn is connected in the manner presently described to the lower end of the upright rod or shaft —19— or rather to the head —20—.

That is, the disk —80— is provided with a stud —81— eccentric to its axis for supporting a roller —82— which in turn extends into a diametrically elongated slot —83— in the inner face of the head —20— to engage the lower and upper walls of said slots, and thereby to transmit vertical reciprocatory motion to the rod —19— as the disk —80— is rotated, which enables the rod —19— to be reciprocated in a rectilinear direction.

The motor-supporting-frame —66— and gear-case —67— are mounted on the under side of the platform —1— as shown in Fig. 2, and are preferably located wholly within the margin of said platform or within the legs —2—.

The hub —79— of the disk —80— is journaled intermediate its ends in a suitable bracket —84— which in turn is mounted on a lug or lugs —85— on the under side of the platform —1—, as shown in Figs. 11 and 12.

The rotation of the disk —80— is controlled by means of a clutch composed of coaxial sections —86— and —87—, one of which as —86—, is secured by a set-screw —88— to the hub —79— of the disk —80— to rotate therewith, the other clutch-section —87— being split through one side and tightly clamped to a sleeve —90—, which in turn is keyed by a key —91— to the shaft —78— to permit the sleeve —90— with the clutch-section —87— thereon to slide axially upon said shaft into and out of engagement with the clutch-section —86—.

The clutch-section —87— is shifted into engagement with its companion clutch-section —86— by means of a rod —92— which is slidable endwise in a bearing —93— in the lug —85— on the under side of the platform —1—, and is provided with a lengthwise groove —94— in one side for receiving a key —95— which serves to hold the rod —92— against rotation in its bearing —93—, the key —95— being yieldingly held in the groove —94— by means of a spring —96—, which may be adjusted by means of a screw —97—, as shown in Fig. 18.

The shifting-rod —92— is movable parallel with the shaft —78— and is provided at its inner end with a forked-arm —98— embracing the shaft —78— and engaging the inner end of the sleeve —90—, the outer end of said rod —92— being pivotally connected to the lower end of an operating-lever —99— which is fulcrumed at —100— upon the bracket —14— and extends upwardly therefrom at the exterior of the vat near the upright shaft —19— to a point near the top of the vat for convenience of manipulation.

Suitable means is provided for automatically shifting the clutch-section —87— out of engagement with its companion clutch-section —86— when the forked-arm —98— is withdrawn from engagement with the adjacent end of the sleeve —90—, and for this purpose the forked-arm —98— is caused to overhang the upper side of the clutch-section —87—, and is provided with an inclined cam-face —101— movable into the path of a reverse cam-face —102— on the outer end of the clutch-section —87—, as the latter continues to rotate after the arm —98— has been forced to its released position, the engagement of the cam-face —102— with the cam-face —101— serving to shift the clutch-section —87— out of engagement with its companion clutch-section —86—.

It will be noted upon reference to Fig. 14 that the clutch-section —87— is adjustable around and upon the sleeve —90—, the object of which is to permit the automatic release of the clutch-section —87— from engagement with the clutch-section —86— only when the plunger —30— with the cups thereon has been raised to their highest position out of the washing fluid and out of engagement with the clothes.

In machines of this character, it is desirable to impart intermitting rotary motion to the plunger —30— and its cups —44—, and for this purpose a collar —104— is loosely mounted upon the intermediate portion of the sleeve —36—, Figs. 8, 9 and 10 between the lower and upper arms of the —U— shaped head —35—, and is provided in one side with a spherical socket —105— for receiving the ball shaped end —106— of a lever —107— having its other end pivoted at —108— to the head of the bolt —109— which in turn is journaled in the upper lever —27— to rock therein.

The periphery of the sleeve —36— is grooved a short distance circumferentially to form a circumferentially extending cam-face —110— eccentric to the axis of said sleeve for receiving and engaging a ball-clutch —111— which also rests against the inner face of the collar —104—, whereby when the collar is rotated in the direction indicated by arrow —X—, Fig. 10, it will impart rotary motion in the same direction to the sleeve —36— through the medium of the clutch-ball —111—, thereby transmitting similar rotary motion to the plunger —30— and dashers carried thereby.

This intermitting rotary motion is produced during the up stroke of the plunger when the dashers are clear from the clothes, and is due to the relative angular movement of the head —35— and upper lever —27— about the axis of the pivot —34— as will be apparent upon examination of Fig. 4 in which it will be seen that as the plunger —30— is raised by the levers —26— and —27—, the knuckle joint —106— and collar —104— will be advanced in the direction indicated by arrow —X—, Fig. 10, thereby causing the ball —111— to rise against the inclined cam-face —110— to impart rotary motion to the shaft —30— in the same direction, while on the other hand, the return of the plunger downwardly will restore the collar —104— and thereby draw the ball —111— back to the deeper side of the channel or lower side of the cam-face —110— without effecting the movement of the plunger rotarily, these operations being repeated at each up stroke and down stroke of the plunger.

In Fig. 3 I have shown an additional counter shaft —115— having one end journaled in the gear-case —67— and provided with a beveled gear —116— meshing with the side of the beveled gear —76— opposite the gear —77—, the opposite end of said shaft being journaled in a gear-case —117— and is provided with a pinion —118— for driving other mechanisms, as for example, a wringer, not shown, but which may be mounted upon the upper end of the vat or other suitable support and driven by an upright shaft having operative connection with the pinion —18.

What I claim is:

1. In a mechanical clothes washer, the combination of a vat, an upright post external to the vat, a bracket mounted on the upper end of the post, a pair of levers of the first kind pivoted to said bracket in planes one above the other and in parallelism and extending over the top of the vat, a plunger carried by said levers, a yoke mounted on the plunger, inverted cup shaped dashers mounted on the yoke, a rod extending vertically through said post, means for reciprocating said rod vertically, and connections between the rod and levers for imparting rocking motion to said levers and vertically reciprocatory motion to the plunger.

2. In a mechanical clothes washer, the combination of a vat having an opening in its top, a plunger extending through said opening, a yoke mounted on the lower end of the plunger, dashers carried by said yoke, an upright post exterior to the vat, a bracket mounted on said post, parallel levers mounted on the bracket, connections between the said levers and upper end of the plunger, a rod movable rectilinearly through said post, connections between said rod and levers, and means for reciprocating the rod.

3. In a mechanical clothes washer, the combination of a vat, a plunger movable through the top of the vat, a tubular head slidable lengthwise of and upon the lower end of the plunger and spring pressed in one direction, a yoke pivotally mounted on said head to rock vertically and provided with oppositely extending arms, and inverted cup shaped dashers mounted on the outer ends of said arms.

4. In a mechanical clothes washer, the combination of a vat, a plunger movable through the top of the vat, a tubular head slidable lengthwise of and upon the lower end of the plunger and spring pressed in one direction, a yoke pivotally mounted on said head to rock vertically and provided with oppositely extending arms, inverted cup shaped dashers mounted on the outer end of said arms, and spring connections between the opposite arms of the yoke and said head.

5. In a mechanical clothes washer, the combination of a vat, a plunger movable through the top of the vat, a tubular head slidable lengthwise of and upon the lower end of the plunger and spring pressed in one direction, a yoke pivotally mounted on said head to rock vertically and provided with oppositely extending arms, and inverted cup shaped dashers mounted on the outer end of said arms, said dashers being connected to the arms of the yoke by universal joints to permit them to swing laterally in all directions.

6. In a mechanical clothes washer, the combination of a vat, a plunger movable vertically through the top of the vat, means for operating said plunger, a head mounted on the lower end of the plunger, a yoke mounted on the lower end of the head and provided with oppositely projecting arms, inverted cup shaped dashers mounted on the outer end of said arms and each provided with an inner annular wall in spaced relation to the outer wall to form an intervening chamber, said chamber having a vent opening in the top thereof, and an automatic valve controlling said vent opening and adapted to close on the up stroke and to open on the down stroke of the dashers.

7. In a mechanical clothes washer, the combination of a vat, a plunger movable vertically through the top of the vat, means for operating said plunger, a head mounted on the lower end of the plunger, a yoke mounted on the lower end of the head and provided with oppositely projecting arms, inverted cup shaped dashers mounted on the outer end of said arms and each provided with an inner annular wall in spaced relation to the outer wall to form an intervening chamber, said chamber having a vent opening in the top thereof, and an automatic valve controlling said vent opening and adapted to close on the up stroke and to open on the down stroke of the dashers, the lower edge of the outer wall of each cup being extended downwardly a greater distance than that of the inner wall.

8. In a mechanical clothes washing machine, the combination of a vat, a plunger movable vertically through the top of the vat, means for reciprocating the plunger, a head mounted on to the lower end of the plunger, a yoke pivoted intermediate its ends to the lower end of said head in the vertical plane of the axis of the plunger, springs interposed between opposite arms of the yoke and said head at opposite sides of said axis, and inverted cup shaped dashers connected by universal joints to the outer ends of the arms of the yoke.

9. In a mechanical clothes washer, the combination of a vat, a plunger movable through the top of the vat, a head mounted on the lower end of the plunger, a yoke mounted on the lower end of the head, inverted cup shaped dashers mounted on the opposite ends of the yoke, an upright post external to the vat, a bracket mounted on the post, parallel levers mounted on the bracket, a rod movable rectilinearly through the post, means for reciprocating said rod, connections between the rod and said levers for transmitting motion thereto, connections between the lever and plunger for transmitting motion from said lever to the plunger, and means actuated by one of said levers for imparting rotary motion to the plunger as the latter is elevated.

10. In a mechanical clothes washer, the combination of a vat, an upright post exterior to the vat, a bracket mounted on said post, parallel levers mounted on the bracket, a rod movable rectilinearly through the post, means for reciprocating said rod endwise, means for transmitting motion from said rod to both of said levers, a plunger movable through the top of the vat, inverted cup shaped dashers and supporting means therefor mounted upon the plunger, means mounted on the levers for supporting said plunger to impart reciprocatory motion thereto, and means actuated by one of the levers for imparting rotary motion to the plunger as the latter is elevated.

11. In a mechanical clothes washer, the combination of a vat, an upright tubular post external to the vat, a rod movable rectilinearly through the post, means for reciprocating the rod, a bracket mounted on the upper end of said post, parallel levers mounted on said bracket and extending over the top of the vat, means for transmitting motion from the rod to said levers, a head pivotally connected to both of said levers, a sleeve rotatable in said head, a plunger extending through the sleeve and through the top of the vat, means for locking the plunger to said sleeve to rotate therewith, a collar journaled on the sleeve to rotate thereon, connections between one of the levers and said collar for rotating the collar upon the sleeve during the upward movement of the plunger, means for transmitting motion from said collar to the sleeve and dasher-supporting-mechanism mounted on the plunger.

12. In a mechanical clothes washing machine, the combination of a vat, an upright tubular post external to the vat, motor driven mechanism below the vat, a rod movable rectilinearly through the post, means for transmitting vertical reciprocating motion from said mechanism to the rod, a bracket mounted upon the upper end of the post, parallel levers mounted upon the bracket to rock vertically, means for transmitting motion from said rod to both of said levers, a plunger movable vertically through the top of the vat, means mounted upon the levers for supporting said plunger, inverted cup shaped dashers within the vat, and supporting means therefor mounted upon the plunger.

13. In a mechanical clothes washing machine, the combination of a vat, an upright tubular post external to the vat, a rod movable rectilinearly through the post, motor driven means beneath the vat for transmitting vertical reciprocatory motion to said rod, a bracket adjustable rotarily of and upon the upper end of the post, parallel levers mounted upon said bracket and extending over the top of the vat, means for transmitting motion from said rod to both of said levers, a plunger movable vertically through the top of the vat, means mounted on the levers for supporting said plunger, inverted cup shaped dashers and supporting means therefor mounted upon the plunger.

14. In a mechanical clothes washer, the combination of a vat, having a one-piece metal bottom, supporting legs for said vat secured to said bottom, a motor supporting frame also secured to the bottom of the vat, a motor mounted in said frame, a gear-case secured to and supported by the bottom of the vat, feed-reducing-gearing mounted within the gear-case and driven by said motor, a tubular post external to the vat, a rod movable rectilinearly through the post, means driven by said gearing for reciprocating said rod in the post, a plunger movable vertically through the top of the vat, dashers within the vat, supporting means for the dashers mounted on said plunger, and means for transmitting motion from said rod to the plunger.

15. In a mechanical clothes washing machine, the combination of a vat, an upright post along the outside of the vat, a bracket journaled on the post to swing about the axis thereof, a plunger movable vertically through the top of the vat, a sleeve mounted on the plunger, movable means for locking said sleeve to the plunger, against relative rotary or endwise movement, a supporting member for said sleeve, a lever fulcrumed on said bracket and having one end pivotally connected to said head, a rod reciprocally movable vertically through said post and operatively connected to the other end of said lever, motor driven mechanism beneath the vat, and means external to the vat for transmitting motion from said mechanism to the vertical reciprocating rod.

16. In a mechanical clothes washer, the combination of a vat, a plunger movable vertically through the top of the vat, a sleeve mounted upon the plunger, movable means for locking the sleeve and plunger against relative rotation and also against relative endwise movement, a supporting head for said sleeve, an upright tubular post external to the vat, a bracket mounted on said post, parallel levers mounted on the bracket and pivotally connected to said free supporting-member, a rod movable vertically through the post, means for transmitting motion from said rod to both of said levers, motor driven mechanism beneath the vat, and means actuated by said mechanism for reciprocating said rod.

17. In a mechanical clothes washing machine, the combination of a vat, a plunger movable vertically through the top of the vat, means for reciprocating the plunger including a sleeve secured to said plunger, a collar loosely mounted on the sleeve to turn about its axis, means actuated by the first named means for imparting a slight rotary motion to the collar as the plunger is elevated, and additional means actuated by the turning movement of said collar for transmitting similar rotary motion to the sleeve and to the plunger carried thereby.

18. In a mechanical clothes washer, the combination of a vat, a plunger movable through the top of the vat, an upright rod external to the vat and reciprocally movable endwise, means for transmitting motion from said rod to the plunger, motor driven means for reciprocating said rod including a clutch and an adjustable-member in proximity to one of the clutch-members cooperating with a part thereon for automatically disconnecting said clutch-members as the plunger reaches the limit of its upward stroke.

19. In a mechanical clothes washing machine, the combination of a vat, a plunger movable through the top of the vat, motor driven means including a clutch for reciprocating said plunger, a clutch shifting part on one of the clutch-members rotating therewith when the clutch-members are engaged, an adjustable contact part movable into and out of the path of rotation of the last named part for engagement therewith when adjusted to one position for disengaging the clutch-members only when the plunger is elevated.

20. In a mechanical clothes washing machine, the combination of a vat, a plunger movable vertically through the top of the vat, an upright rod external to the vat, means for transmitting motion from the rod to the plunger, a counter-shaft beneath the vat, motor driven mechanism for operating the counter-shaft, a rotary disk loosely mounted on the counter-shaft, a clutch having one of its members secured to said disk and its other member splined on the counter-shaft to slide thereon and to rotate therewith, means on the disk for imparting reciprocatory motion to said rod, a cam-member on the sliding clutch-member to rotate therewith, a cooperative cam-member adjustable into and out of the path of the cam-member on the sliding clutch-member for cooperative engagement therewith when adjusted to one position and thereby to disengage the clutch-member, to stop the rotation of the disk and mechanism actuated thereby as the plunger is elevated.

In witness whereof I have hereunto set my hand this 17th day of March 1921.

WILLARD R. WALKER.

Witnesses:
H. E. CHASE,
M. R. COOKE.